(12) United States Patent
Kim

(10) Patent No.: US 6,411,352 B1
(45) Date of Patent: Jun. 25, 2002

(54) SLIM LIQUID CRYSTAL DISPLAY DEVICE

(75) Inventor: Byoung Ku Kim, Kumi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/370,740

(22) Filed: Aug. 9, 1999

(30) Foreign Application Priority Data

Aug. 10, 1998 (KR) .............................................. 98-32376

(51) Int. Cl.⁷ ...................... G02F 1/1333; G02F 1/1345
(52) U.S. Cl. .............................. 349/58; 349/59; 349/60; 349/150
(58) Field of Search .............................. 349/58, 59, 60, 349/149, 150

(56) References Cited

U.S. PATENT DOCUMENTS

| | | | | |
|---|---|---|---|---|
| 4,367,467 A | * | 1/1983 | Emile, Jr. .................... | 340/765 |
| 4,422,728 A | * | 12/1983 | Andreaggi .................. | 350/334 |
| 4,727,285 A | * | 2/1988 | Taniguchi ................... | 313/512 |
| 5,442,470 A | * | 8/1995 | Hashimoto ................... | 359/83 |
| 5,450,221 A | * | 9/1995 | Owen et al. .................. | 359/83 |
| 5,479,285 A | * | 12/1995 | Burke ......................... | 359/83 |
| 5,486,942 A | * | 1/1996 | Ichikawa et al. ............. | 359/83 |
| 5,841,501 A | * | 11/1998 | Eiraku et al. ............... | 349/150 |
| 5,889,582 A | * | 3/1999 | Takahashi et al. .......... | 349/149 |
| 5,986,726 A | * | 11/1999 | Murai ......................... | 349/59 |
| 5,867,235 A | * | 2/2000 | Hasegawa ................... | 349/58 |
| 6,064,453 A | * | 5/2000 | Inubushi et al. ............ | 349/58 |

FOREIGN PATENT DOCUMENTS

JP        05 303109        11/1993

* cited by examiner

Primary Examiner—William L. Sikes
Assistant Examiner—Tarifur R. Chowdhury
(74) Attorney, Agent, or Firm—Long Aldridge & Norman LLP

(57) ABSTRACT

A slim liquid crystal display is adapted to fixing a printed circuit board (PCB) to a frame and making a slimmer liquid crystal display. The slim liquid crystal display includes a frame mounted with a liquid crystal module, a printed circuit board, and a board holder engaged with the frame and loaded on the printed circuit board, thereby securing the printed circuit board to the frame.

17 Claims, 5 Drawing Sheets

SLIM LIQUID CRYSTAL DISPLAY DEVICE

This application claims the benefit of Korean Patent Application No. 98-32376, filed on Aug. 10, 1998, which is hereby incorporated by reference.

BACKGROUND OF THE INVENTION

1. Field of the Invention

The present invention relates to a liquid crystal display device, and more particularly to a slim liquid crystal display allowing a printed circuit board to be fixed on a frame in such a manner that its has a reduced thickness.

2. Discussion of the Related Art

A liquid crystal display (hereinafter, LCD) has such features as being lightweight, thin, and driven using low power. Also, the LCD provides a highly enhanced picture quality owing to an improvement in liquid crystal material and development in a fine picture element (or pixel) treatment technique. Furthermore, the application field of the LCD is gradually becoming wide. For example, the LCD acts as a display apparatus in a notebook personal computer. Such a notebook personal computer is slim and lightweight for portability.

The LCD used for the notebook personal computer includes a top case 2 surrounding side faces and edges of a liquid crystal module (hereinafter, LCM) 4. The LCM 4 is mounted on a frame 6. The side faces of the frame 6 are surrounded by the top case 2. The LCM 4 has a light guide, light sheets, a lower polarizing plate, a lower glass substrate, a liquid crystal layer, an upper glass substrate, and an upper polarizing plate disposed sequentially on the frame 6.

Also, there is mounted a printed circuit board (hereinafter, PCB) 8 below the frame 4. The PCB 8 is connected to drive integrated circuit (hereinafter, D-IC) 10 for driving switching elements (i.e., thin film transistor array) on the LCM 4, by means of a tape carrier package (hereinafter, TCP) 12. The TCP 12 connects electrically the D-IC 10 with the LCM 4 and transmits a video signal from the D-IC 10 to the switching elements on the LCM. The switching elements on the LCM 4 transmit the video signals from the D-IC 10 connected to the PCB 8 to the liquid crystal layer to partially vary the transmissivity of the liquid crystal layer according to the video signals, thereby displaying a picture corresponding to the video signal.

FIG. 2 shows the PCB 8 loaded on the upper portion of the rear face of the frame 6 The PCB 8 is fixed to the frame 6 by a screw for stability. However, the screw does not fix the PCB 8 to the frame 6 because the thickness of the frame 6 is reduced according to the thinness of the liquid crystal display. Actually, if the PCB 8 is fixed to the frame 6, bars forming the frame 6 have a thickness above 3 mm. In order to slim down the liquid crystal display, the frame must be formed by the bars having a thickness below 3 mm. In this case, the PCB 8 is fixed to the rear face of the frame 6 by a double-sided tape 14. In the fixing method using the double-sided tape 14, the double-sided tape is first adhered to the rear face of the frame 6. Next, a peeling sheet is peeled off from the double-sided tape and then the PCB 8 is adhered to the double-sided tape 14, thereby fixing the PCB 8 on the rear face of the frame 6. Also, a grounding tape 16 is adhered to an edge of the PCB 8 and on a sidewall of the top case 2 such that the PCB is grounded. In the method for fixing the PCB 8 to the frame 6 using the double-sided tape 14, the working or process time increases greatly. Fixing the PCB 8 to the frame 6 causes a force on the PCB 8, which may be enough to separate the PCB 8 from the double-sided tape 12. From this, additional problems arise. Also, the grounding tape 16 has a lower grounding performance for the PCB 8 as compared to a metallic material. In view of the foregoing, there is a need for a method of fixing with stablity the PCB to the frame in such a manner as to slim down the liquid crystal display.

SUMMARY OF THE INVENTION

Accordingly, the present invention is directed to a slim liquid crystal display that substantially obviates one or more of the problems due to limitations and disadvantages of the related art.

An object of the present invention is to provide a slim liquid crystal display that is adapted to fixing a PCB to a frame and making a slimmer liquid crystal display.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the above-noted and other advantages and in accordance with the purposes of the present invention, as embodied and broadly described, a slim liquid crystal display according to one aspect of the present invention includes a frame mounted with a liquid crystal module; a printed circuit board; and a fixing unit engaged with the frame and loaded on the printed circuit board, thereby securing the printed circuit board to the frame.

In another aspect of the present invention, a liquid crystal display comprises a frame having a liquid crystal module; a printed circuit board; a board holder engaged with the frame and fixed to the printed circuit board, the board holder securing the printed circuit board to the frame.

In another aspect of the present invention, a slim liquid crystal display comprises a frame having a liquid crystal module; a printed circuit board; a board holder securing the printed circuit board to the frame, the board holder comprising a first plate having a first fastening member; a second plate coupled to the first plate having a second fastening member, the first and second fastening members engaging with the frame; and a third fastening member between the first and second plates, the third fastening member helps to secure the printed circuit board to the frame.

In another aspect of the present invention, a portable computer having a liquid crystal display comprises a frame having a liquid crystal module; a printed circuit board; a board holder engaged with the frame and fixed to the printed circuit board, the board holder securing the printed circuit board to the frame.

In a further aspect of the present invention, a portable computer having a slim liquid crystal display comprises a frame having a liquid crystal module; a printed circuit board; a board holder securing the printed circuit board to the frame, the board holder comprising a first plate having a first fastening member; a second plate coupled to the first plate having a second fastening member, the first and second fastening members engaging with the frame; and a third fastening member between the first and second plates, the third fastening member helps to secure the printed circuit board to the frame.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

Figure 1:
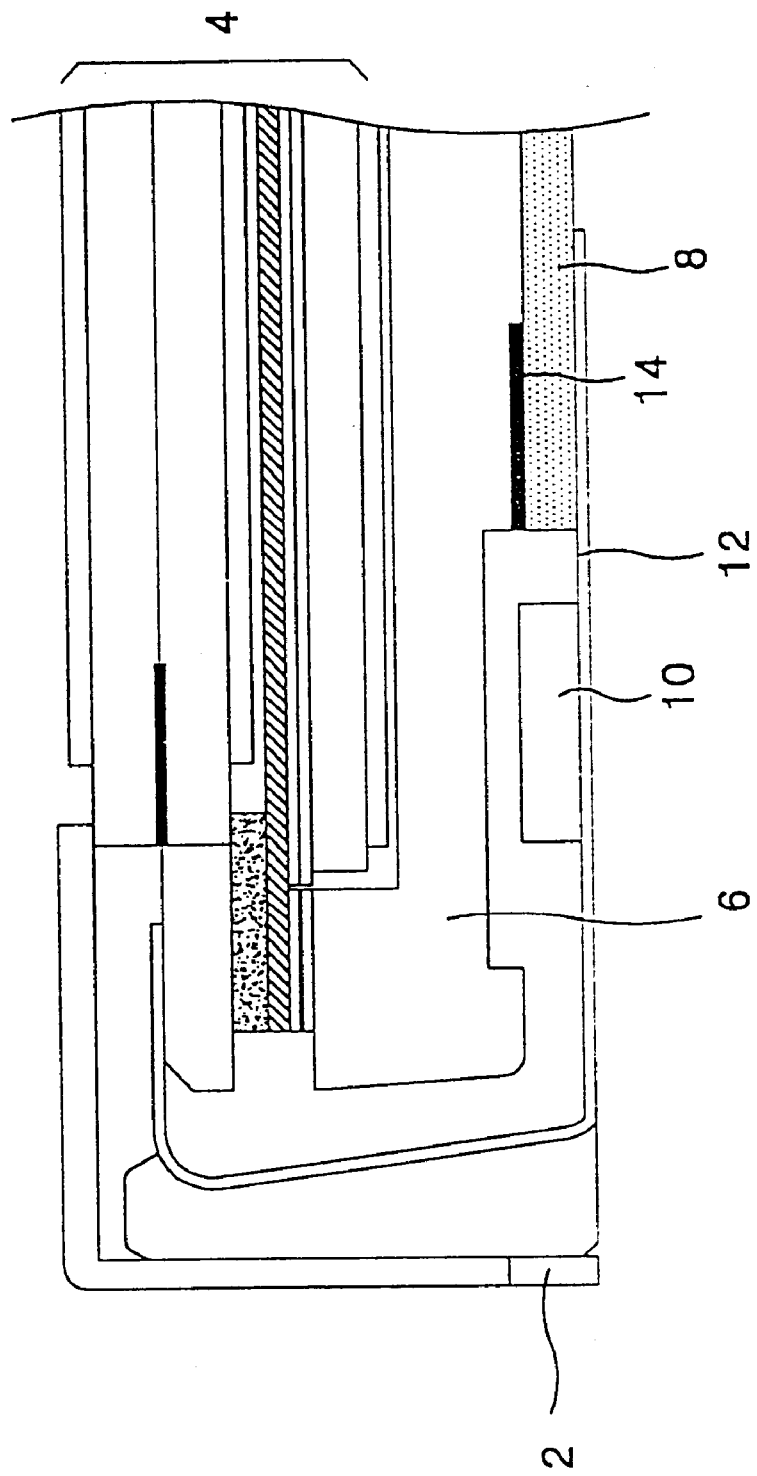
FIG. 1 is a sectional view showing a conventional liquid crystal display.
Figure 2:
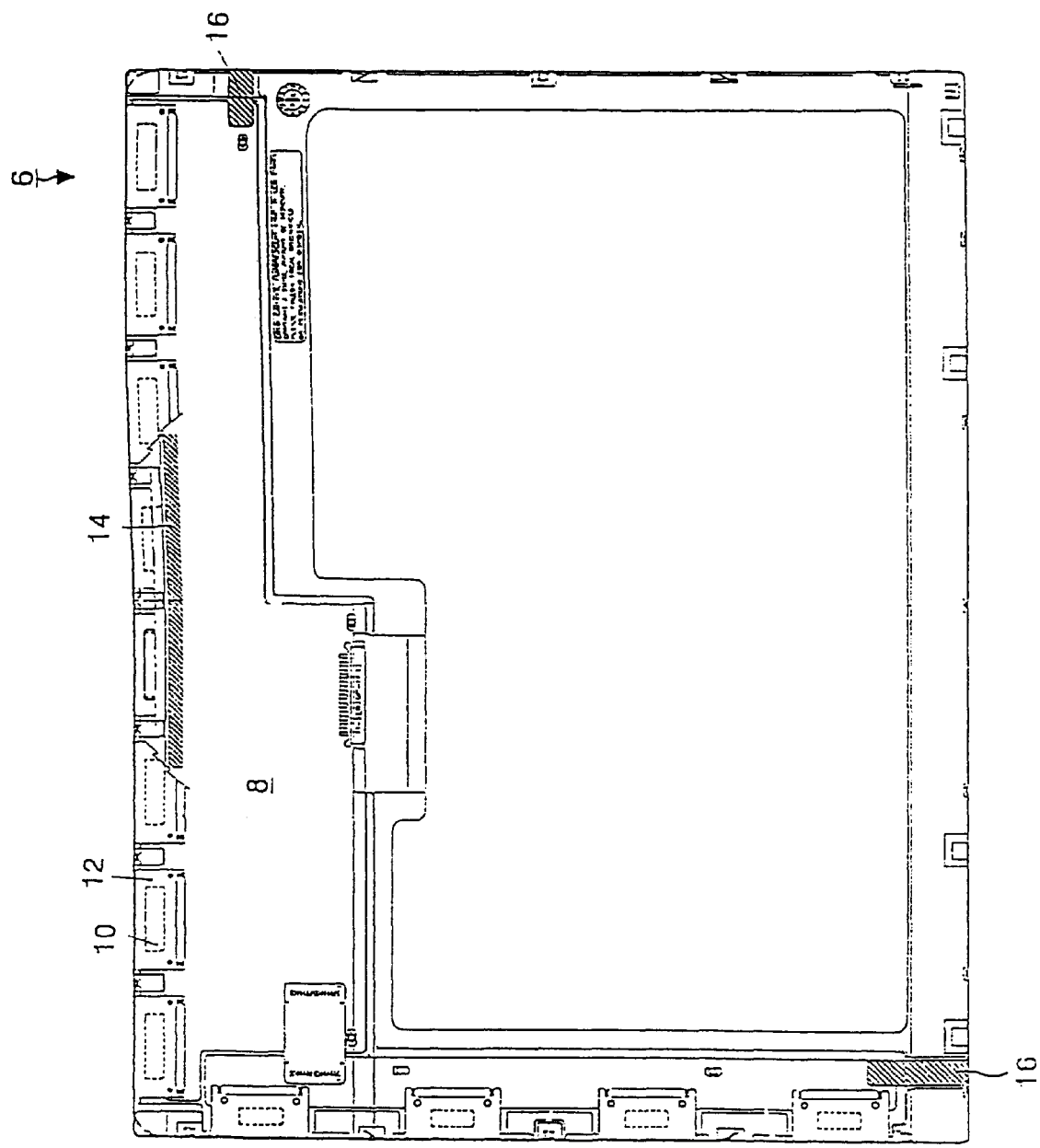
FIG. 2 is a rear view of the frame shown in FIG. 1.
Figure 3:
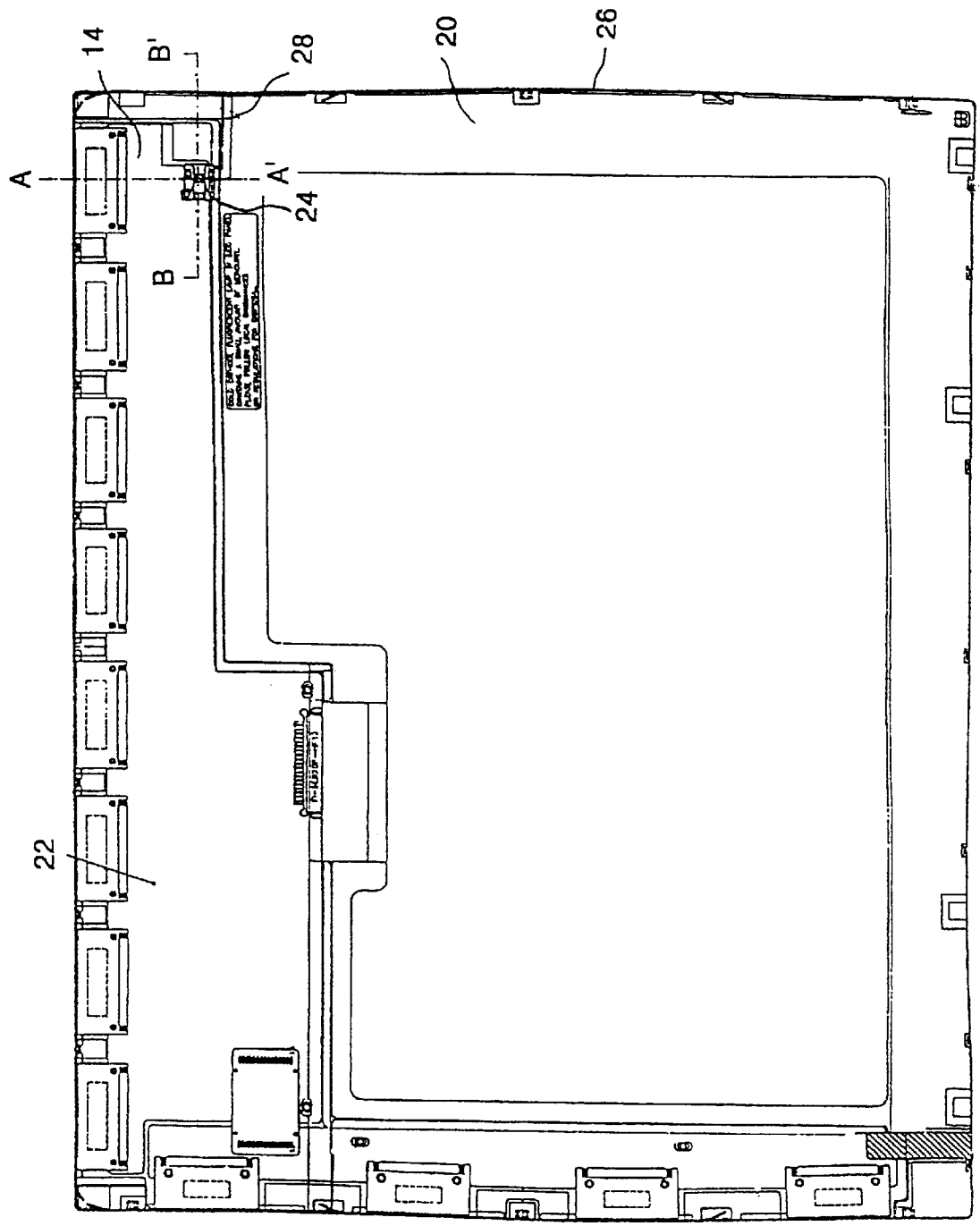
FIG. 3 is a rear view of a frame for a slim liquid crystal display according to an embodiment of the present invention.

Referring to FIG. 3, a slim liquid crystal display according to an embodiment of the present invention includes a frame 20 for supporting the liquid crystal module and a board holder 24 engaged with the frame 20 to fix the PCB 22. The frame 20 loads LCM thereon and mounts the PCB 22 on its rear face. The board holder 24 is engaged with the frame 20 and fixed on the PCB 22 preferably by means of a screw (not shown), thereby mounting the PCB 22 on the rear face of the frame 20. The bars forming the frame 20 have a thickness of above 1.6 mm, which allows the board holder 24 to be engaged with the frame 20 to fix the PCB 22 to the frame 20. Consequently, the board holder 24 allows the bars of the frame 20 to be thin and the LCD to be slim. Therefore, the slim LCD according to the embodiment of the present invention can fix with stability the PCB 22 on the rear face of the frame 20. Also, in the slim LCD according to the embodiment of the present invention, the time required for fixing the PCB 22 to the frame is reduced. Furthermore, the slim LCD according to the embodiment of the present invention can prevent additional problems caused by separation or lift-off of the PCB from the double-sided tape.

Figure 4:
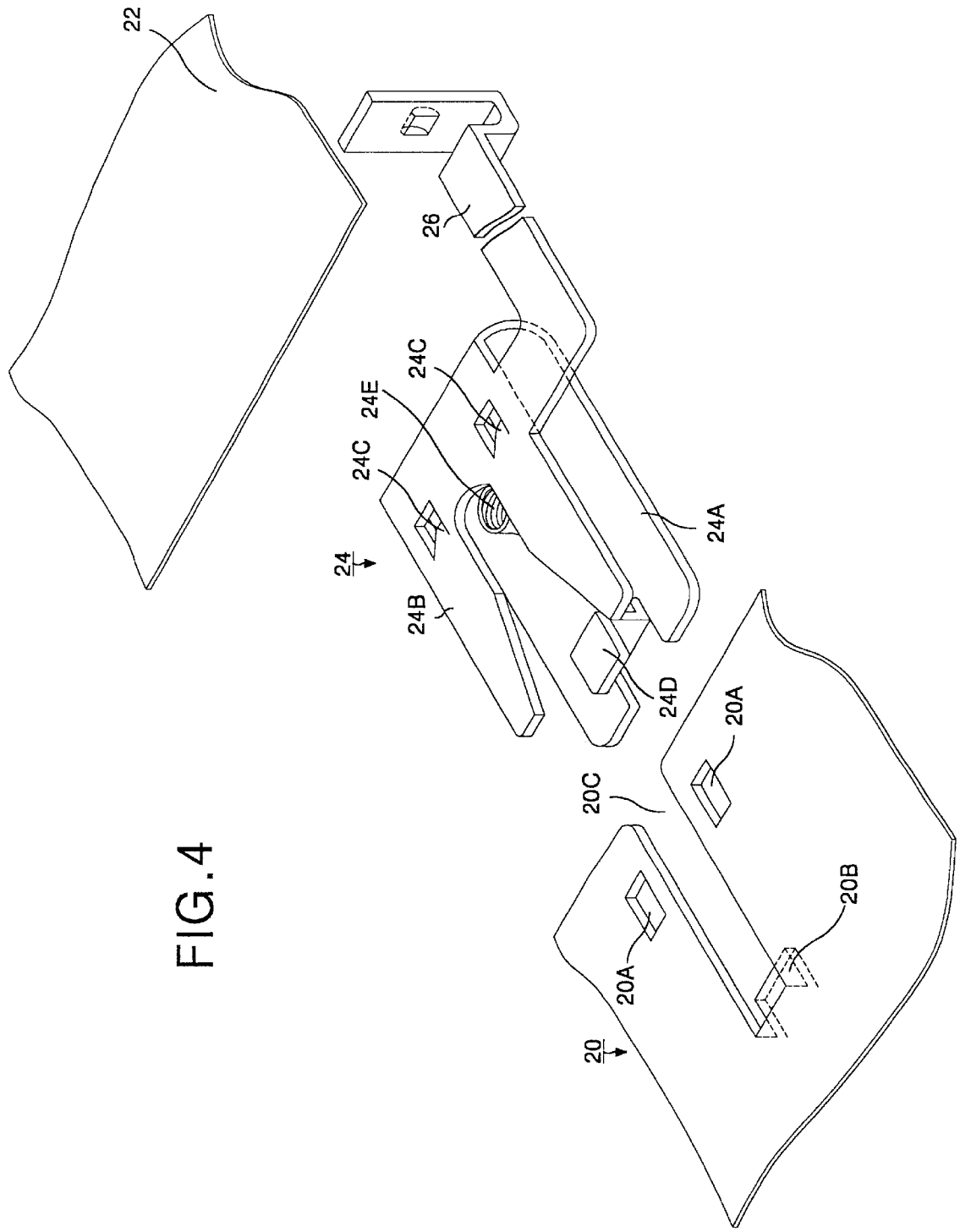
FIG. 4 is an exploded perspective view showing the board holder and frame shown in FIG. 3.

FIG. 4 shows in detail the board holder 24 to be engaged with the frame as shown in FIG. 3. In FIG. 4, the board holder 24 includes a base plate 24A and securing wings 24B installed over the base plate 24A to form a gap. The securing wings 24Bare connected to a wall extended from the rear edge of the base plate 24A. Also, the securing wings 24B are preferably formed as one body with the base plate 24A. The gap between the base plate 24A and the securing wings 24B receives the frame 20 to engage the board holder 24 with the frame 20. The securing wings 24B each has a first hook 24C formed at the rear half thereof. The first hook 24C is extended toward the rear edge of the securing wing 24B, downwardly. The base plate 24A has a second hook or flange 24D formed near its front edge and a female screw 24E located at its center and exposed between the securing wings 24B. The second hook 24D extends upwardly toward the front edge of the base plate 24A. The female screw 24E protrudes upwardly. Also, the female screw 24E receives a screw (not shown) passing through it and the PCB 22 when the board holder 24 is disposed on the PCB 22, thereby fixing the board holder 24 on the PCB 22. Furthermore, the board holder 24 is connected with a grounding lead 26. The grounding lead 26 extends from the side edge of any one of the securing wings 24B. One end of the grounding lead 26 is connected to the PCB 22 through the board holder 24 and another end of the grounding lead 26 also is coupled to a top case (not shown). In other words, the grounding lead 26 grounds the PCB 22 to the top case. Also, there are holes 20A near the edge of the frame 20. The holes 20A are located at both sides of a guide groove 20C, respectively. The guide groove 20C exposes the female screw 24E of the board holder 24 when the frame 20 is engaged with the board holder 24. Each insole 20A receives the first hook 24C of the securing wing 24B to engage the first hook 24C with the edge of the frame 20. Also, the frame 20 has a guide protrusion 20B located below the end of the guide groove 20C. The guide protrusion 20B protrudes outwardly and engages with the second hook 24D of the base plate 24A when the frame 20 is inserted into the gap between the base plate 20A and the securing wings 20B. Then, the second hook 24D of the base plate 24A engages with the guide protrusion 20B.

Figure 5:
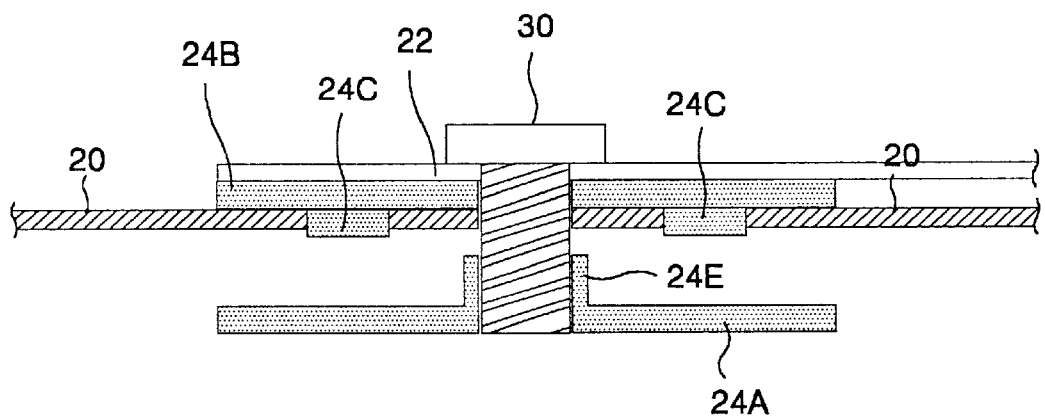
FIG. 5 is a sectional view of the liquid crystal display taken along the A—A' line in FIG. 3.

FIG. 5 is a sectional view of the liquid crystal display taken along line A–A' in FIG. 3. Referring to FIG. 5, the PCB 22 is fixed to the frame 20 by means of the board holder 24. The frame 20 supports the LCM loaded on its surface and mounts the PCB 22 fixed on its rear face by means of the board holder 24. The first hook 24C of the board holder 24 is inserted into the hole 20A. The board holder 24 is fixed closely to the PCB by a screw 30 inserted into the female screw 24E through the PCB 22.

Figure 6:
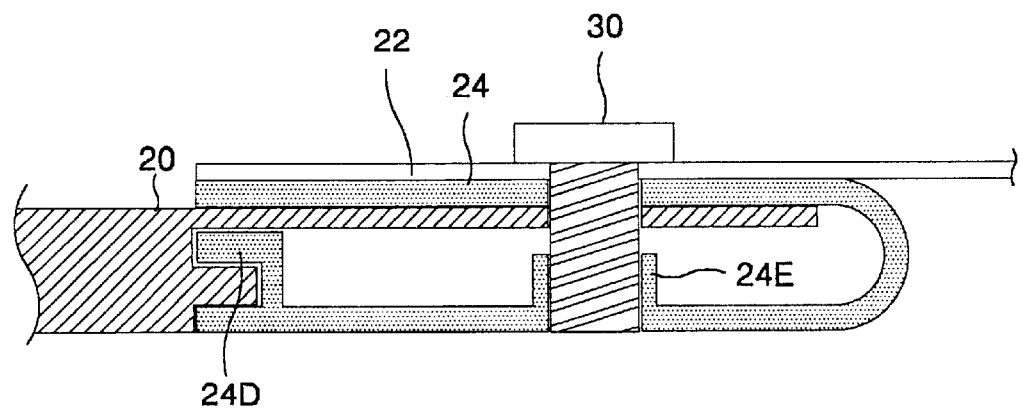
FIG. 6 is a sectional view of the liquid crystal display taken along the B—B' line in FIG. 3.

FIG. 6 is a sectional view of the liquid crystal display taken along line B–B– in FIG. 3. FIG. 6 also shows the PCB 22 fixed to the frame 20 by means of the board holder 24. In FIG. 6 the frame 20 loads the LCM on its surface and mounts the PCB 22 on its rear face. The second hook 24D of the board holder 24 is disposed on or coupled to the guide protrusion 20B of the frame 20.

As described above, the slim liquid crystal display according to the embodiment of the present invention fixes the PCB to the frame by means of the board holder. To this end, the PCB is fixed with stability, and furthermore, the liquid crystal display becomes slim. Also, the slim liquid crystal display according to the embodiment of the present invention allows the manufacturing time to be reduced. Furthermore, in the slim liquid crystal display according to the embodiment of the present invention, the PCB is grounded toward the top case by the grounding lead extended from the board holder, thereby enhancing the grounding performance of the PCB.

It will be apparent to those skilled in the art that various modifications and variation can be made in the slim liquid crystal display of the present invention without departing from the spirit or scope of the invention. Thus, it is intended that the present invention cover the modifications and variations of this invention provided they come within the scope of the appended claims and their equivalents.

What is claimed is:

1. A liquid crystal display comprising:
   a frame having a liquid crystal module;
   a printed circuit board; and
   a board holder engaged with the frame and fixed to the printed circuit board, the board holder securing the printed circuit board to the frame;

wherein the board holder has first and second plates and wherein the printed circuit board is disposed between the first and second plates.

2. The liquid crystal display according to claim 1, wherein the board holder includes a first fastening member and the frame includes a second fastening member, the first fastening member being coupled to the second fastening member.

3. The liquid crystal display according to claim 1, wherein the board holder has first and second plates, the first plate including a hole for receiving a screw through the printed circuit board placed between the first and second plates.

4. The liquid crystal display according to claim 3, wherein the board holder includes a first fastening member and the frame includes a second fastening member, the first fastening member being coupled to the second fastening member.

5. The liquid crystal display according to claim 4, wherein first fastening member includes a hook and the second fastening member includes an opening for receiving the hook.

6. The liquid crystal display according to claim 4, wherein the first fastening member includes a flange and the second fastening member includes a guide protrusion, the flange being engaged with the guide protrusion.

7. The liquid crystal display according to claim 4, wherein first fastening member includes a hook and a flange and the second fastening member includes an opening for receiving the hook and a guide protrusion for engaging with the flange.

8. The liquid crystal display according to claim 1, wherein the board holder has first and second plates, and the printed circuit board is secured between the first and second plates.

9. The liquid crystal display according to claim 1, further comprising:
a case for surrounding the frame; and
a grounding lead connecting the board holder to the case for grounding the printed circuit board.

10. A slim liquid crystal display comprising:
a frame having a liquid crystal module;
a printed circuit board;
a board holder securing the printed circuit board to the frame, the board holder comprising:
a first plate having a first fastening member;
a second plate coupled to the first plate having a second fastening member, the first and second fastening members engaging with the frame; and
a third fastening member between the first and second plates, the third fastening member helps to secure the printed circuit board to the frame.

11. The slim liquid crystal display according to claim 10, wherein the printed circuit board is placed between the first and second plates of the board holder and the third fastening member secures the printed circuit board between the first and second plates.

12. The slim liquid crystal display according to claim 11, wherein the third fastening member includes a screw going through the printed circuit board and inserted into a threaded hole.

13. The slim liquid crystal display according to claim 11, further comprising:
a case for surrounding the frame; and
a grounding lead connecting the board holder to the case for grounding the printed circuit board.

14. The slim liquid crystal display according to claim 13, wherein the grounding lead includes metal.

15. The slim liquid crystal display according to claim 13, wherein the board holder and the grounding lead is of a single mold.

16. A portable computer having a slim liquid crystal display comprising:
a frame having a liquid crystal module;
a printed circuit board;
a board holder securing the printed circuit board to the frame, the board holder comprising:
a first plate having a first fastening member;
a second plate coupled to the first plate having a second fastening member, the first and second fastening members engaging with the frame; and
a third fastening member between the first and second plates, the third fastening member helps to secure the printed circuit board to the frame.

17. A portable computer having a liquid crystal display comprising:
a frame having a liquid crystal module;
a printed circuit board; and
a board holder engaged with the frame and fixed to the printed circuit board, the board holder securing the printed circuit board to the frame;
wherein the board holder has first and second plates, and wherein the printed circuit board is disposed between the first and second plates.

* * * * *